July 30, 1968 E. W. VAN ZUUREN 3,395,310

APPARATUS FOR GENERATING TIME MARKERS ON THE SCREEN OF A CATHODE RAY TUBE IN WHICH THE HORIZONTAL SPEED OF THE BEAM CONTINUOUSLY VARIES BETWEEN A GIVEN VALUE, AND SUBSTANTIALLY ZERO WHEN THE MARKER IS TURNED ON

Filed May 11, 1964 2 Sheets-Sheet 1

INVENTOR
EDUARD W. VAN ZUUREN
BY
Frank R. Trifari
AGENT

INVENTOR.
EDUARD W. VAN ZUUREN
BY
Frank R. Trifari
AGENT

United States Patent Office 3,395,310

Patented July 30, 1968

3,395,310

APPARATUS FOR GENERATING TIME MARKERS ON THE SCREEN OF A CATHODE RAY TUBE IN WHICH THE HORIZONTAL SPEED OF THE BEAM CONTINUOUSLY VARIES BETWEEN A GIVEN VALUE, AND SUBSTANTIALLY ZERO WHEN THE MARKER IS TURNED ON

Eduard Willem Van Zuuren, Hilversum, Netherlands, assignor to North American Philips Company, Inc., New York, N.Y., a corporation of Delaware Filed May 11, 1964, Ser. No. 366,414

Claims priority, application Netherlands, May 10, 1963, 292,617

9 Claims. (Cl. 315—22)

ABSTRACT OF THE DISCLOSURE

A system for generating time markers on the screen of a cathode ray tube includes a sawtooth sweep voltage source, a source of sinusoidal voltage, and a periodic voltage source harmonically related to the sinusoidal voltage. The sinusoidal voltage is applied to the vertical deflection plates of the tube and the sweep voltage and periodic voltage are applied to the horizontal deflection plates. The frequencies and amplitudes of the voltages are so related that the movement of the electron beam is virtually stopped in the horizontal direction at those instants of time when the sinusoidal voltage on the vertical plates sweeps the beam past the horizontal axis.

This invention relates to a system for generating time markers on the screen of a cathode ray tube.

It is often desirable, when reproducing electric phenomena on the screen of an oscilloscope as a function of time, to have visible time markers available for calibration purposes. In other words, the time axis is subdivided into a number of equal parts which represent equal time intervals.

Figure 1:
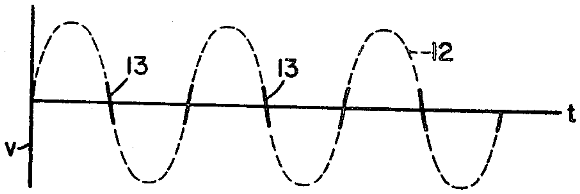
FIG. 1 PRIOR ART

It is known that time markers can be produced by means of a sinusoidal voltage supplied to the vertical deflection plates. This voltage periodically deflects the light spot on the screen upwards and downwards during the movement thereof in the horizontal direction under the influence of a sawtooth voltage. It is normal to darken the light spot periodically as soon as the distance to the time-axis exceeds a given value. The edges of the sine curve with the greatest slope are reproduced on the screen and thus form the desired marking lines. The curve 12 of FIG. 1 shows the picture which is thus obtained. The horizontal line is the time axis. The parts shown in broken lines are not visible on the screen. The parts 13 are clearly visible on the screen and represent the reference lines.

A drawback of this solution is that the lines do not extend at right angles to the time axis. It is true that the error is small provided that only a very small part of each of the lines is reproduced, but in this case the brightness is insufficient since the line is reproduced in a very short period of time.

It is an object of the invention to mitigate this drawback. The invention is characterized in that in addition to the time-base voltage varying linearly in time, a periodic voltage also is supplied to the horizontal deflection plates. The periodic voltage is chosen so as to have a given harmonic relation relative to the voltage operative on the vertical deflection plates. The voltages are chosen so that the horizontal speed of the light spot on the screen produced by the two voltages applied to the horizontal deflection plates is substantially equal to zero at given points of time when the spot passes through the time axis under the influence of the vertical deflection voltage.

A clear time marker is displayed because during said passages through zero, the spot moves substantially at right angles to the time axis, and furthermore, at that time the spot moves at a slow speed.

It should be understood that the term "harmonic relation" means that the ratio of the frequencies of the alternating voltages is a simple rational number. Preferably the frequencies are equal.

The speed of the light spot outside the instants in question is rather large so that the brightness is small. Nevertheless, it will often be advisable, even when using the invention, to darken the light spot after reaching points above or below the time axis where the speed in the horizontal direction has reached a given small value.

Figure 5:
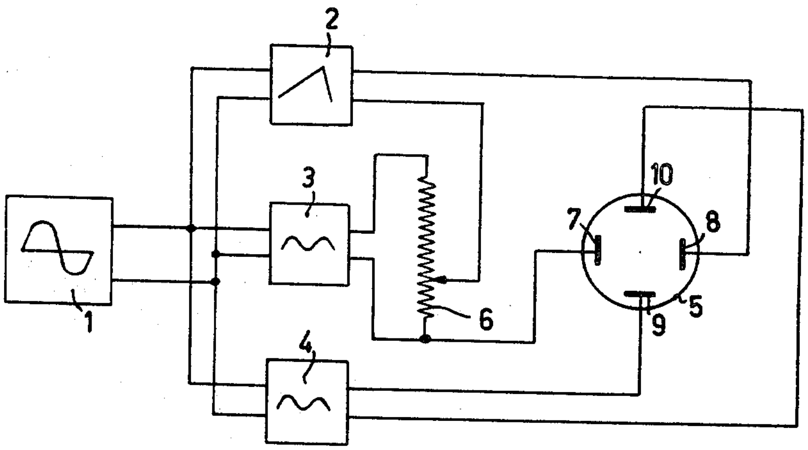
Figures 2, 3:
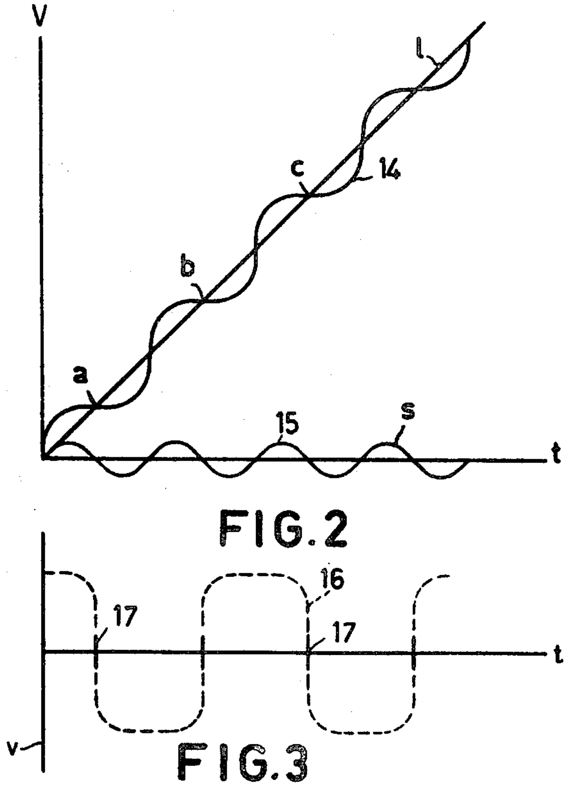
Figure 4:
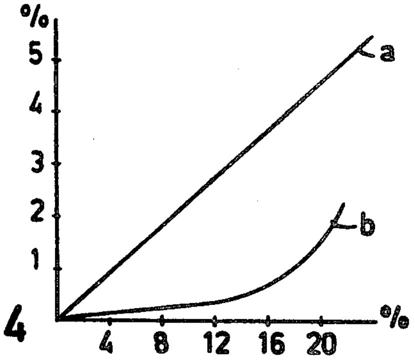

In order that the invention may readily be carried into effect, it will now be described more fully, by way of example, with reference to FIGURES 2–5 of the accompanying drawing in which: FIGURES 2–4 are graphic diagrams illustrating the invention and FIG. 5 is a schematic diagram of an embodiment of the invention.

In FIGURE 2 the horizontal axis again is the time axis. The voltages are plotted on the vertical axis. The sinusoidal voltage 15 is supplied to the horizontal deflection plates together with the time-base voltage 1 varying linearly. The sinusoidal voltage 15 is also operative at the vertical deflection plates. The ratio of the voltages according to amplitude and phase must preferably be arranged so that the differential coefficient of the sine waveform at the passages through zero equals the slope of the sawtooth waveform. In this case the speed of the light spot in the horizontal direction at the points *a*, *b*, *c* is substantially zero and the marker lines will extend susbtantially vertically.

The same sawtooth generator and deflection amplifier may be used during both the measuring period and the period for writing the reference lines. Consequently, the accuracy of the time measurement depends substantially on the accuracy of the frequency of the sinusoidal voltage.

FIG. 3 shows the subdivision of the time axis when using the same frequency for deflection and correction. The reference lines 17 are substantially vertical to the horizontal axis. The parts 16 are not visible.

FIG. 4 shows the relation between the illumination period of the sine curve as a percent of a full period of the sine wave (horizontal axis) versus the deviation from a straight line as a percent of the distance between a straight line and the actual line. The curve *a* indicates the relation between the vertical error as a function of the illumination time expressed as a percentage of the duration of a full period for the prior art technique of FIG. 1. Curve *b* illustrates the same relation for the system according to the invention. It appears that by use of the correction according to the invention a great improvement is obtained since the percentage of vertical error is much lower for curve *b*, at least up to a period of illumination equal to 20% of a full period of the sine wave.

FIG. 5 shows a block diagram of an arrangement according to the invention containing an oscillator 1, preferably a sine-wave oscillator. In the sawtooth generator 2, a sawtooth voltage is generated for the horizontal deflection of the electron beam of the C.R.T. 5. In the arrangement 3 sine-wave voltage is produced, part of which, taken from the potentiometer 6, is superimposed upon the sawtooth voltage. The resulting voltage is supplied to the horizontal electrodes 7 and 8 and is indicated by the curve 14 in FIGURE 2. The arrangement 4 provides the vertical deflection voltage at the electrodes 9 and 10. It is indicated by the letter *s* 15 in FIGURE 2.

By means of time sharing techniques, the reproduction of the time marking occurs alternately with the reproduction of the electric phenomenon or, in the case of double beam oscilloscopes, simultaneously.

What is claimed is:

1. A system for generating time markers on the screen of a cathode ray tube comprising, a source of linearly varying sweep voltage, a source of sinusoidal voltage, means for applying said sinusoidal voltage to the vertical deflection means of said cathode ray tube, a source of periodic voltage of a frequency harmonically related to said sinusoidal voltage, means for continuously applying said sweep voltage and said periodic voltage to the horizontal deflection means of said cathode ray tube thereby to produce a horizontal movement of the cathode ray beam, the frequency and amplitude of said sweep and periodic voltages being related so that the horizontal speed of said beam periodically and continuously varies between a given finite value and a substantially zero value during a sweep period, the harmonic relation between said sinuosidal and periodic voltages being fixed so that said sinusoidal voltage vertically deflects said beam past the horizontal axis at those instants when the horizontal speed of the beam is of substantially zero value.

2. A system as defined in claim 1 wherein said source of periodic voltage supplies a sinusoidal voltage that passes through zero coincidentally with the zero passages of the sinusoidal voltage applied to the vertical deflection means.

3. A system as defined in claim 1 wherein said source of periodic voltage supplies a second sinusoidal voltage of the same frequency and phase as that of the first sinusoidal voltage applied to the vertical deflection means.

4. A system as defined in claim 3 wherein the slope of the first sinusoidal voltage at the zero crossover point is approximately equal to the slope of said sweep voltage.

5. A system as defined in claim 1 wherein said source of periodic voltage supplies a sinusoidal voltage of a frequency harmonically related to the frequency of the sinusoidal voltage applied to the vertical deflection means, said system further comprising means for blanking said cathode ray beam at given points above and below the horizontal axis at which the horizontal speed of said beam exceeds a given value.

6. A display system comprising a cathode ray tube having horizontal and vertical deflection plates, a source of sawtooth sweep voltage, a source of sinusoidal voltage of a given frequency, means for continuously applying said sinusoidal voltage to the vertical deflection plates of said cathode ray tube during a sweep period, a source of periodic voltage of a frequency harmonically related to the frequency of said sinusoidal voltage, means for continuously applying said sweep voltage and said periodic voltage to the horizontal deflection plates of said cathode ray tube thereby to produce a continuously variable speed horizontal movement of the cathode ray beam, the frequencies and amplitudes of said voltages being related so that during a sweep period the horizontal speed of said beam periodically achieves a substantially zero value at given instants when the sinusoidal voltage vertically deflects the beam through the horizontal beam axis.

7. A system as defined in claim 6 wherein said source of periodic voltage supples a sinusoidal voltage of a frequency harmonically related to the frequency of the sinusoidal voltage applied to the vertical deflection plates.

8. A system as defined in claim 6 wherein said source of periodic voltage supplies a sinusoidal voltage of the same frequency as said given frequency and related in phase thereto such that the zero cross-over points of the vertical and horizontal sinusoidal voltages occur simultaenously, the slope of the vertical sinusoidal voltage at its zero cross-over point being approximately equal to the slope of said sweep voltage.

9. A system for generating time markers on the screen of a cathode ray tube comprising, means for generating a sawtooth sweep voltage, means for generating a sinusoidal voltage, means for applying said sinusoidal voltage to the vertical deflection plates of said tube, means for applying said sweep voltage and a portion of said sinusoidal voltage to the horizontal deflection plates of said tube thereby to produce a variable speed horizontal movement of the cathode ray beam, the frequencies and amplitudes of said sweep and sinusoidal voltages being interrelated so that during a sweep period the horizontal speed of said beam periodically approaches a zero value at given instants of time when the sinusoidal voltage on said vertical plates deflects the beam through the horizontal beam axis.

References Cited

UNITED STATES PATENTS

| | | | |
|---|---|---|---|
| 2,432,196 | 12/1947 | Hershberger | 315—24 |
| 2,438,904 | 4/1948 | DeRosa | 315—23 |
| 2,448,363 | 8/1948 | Firestone | 315—24 |
| 2,604,608 | 7/1952 | Moore | 315—23 |

OTHER REFERENCES

Book "Cathode Ray Tube Displays" by Soller, Starr, Valley, Chapter 6 "Electronic Markers and Indices," pages 234–235.

ROBERT L. GRIFFIN, *Primary Examiner.*

R. K. ECKERT, Jr., *Assistant Examiner.*